US012127191B2

(12) United States Patent
Yang et al.

(10) Patent No.: US 12,127,191 B2
(45) Date of Patent: Oct. 22, 2024

(54) CONDITIONS TO DELAY HARQ-ACK FOR SPS PDSCH

(71) Applicant: QUALCOMM Incorporated, San Diego, CA (US)

(72) Inventors: Wei Yang, San Diego, CA (US); Yi Huang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/486,860

(22) Filed: Sep. 27, 2021

(65) Prior Publication Data

US 2022/0104234 A1 Mar. 31, 2022

Related U.S. Application Data

(60) Provisional application No. 63/084,535, filed on Sep. 28, 2020.

(51) Int. Cl.
*H04W 72/0446* (2023.01)
*H04L 5/00* (2006.01)
*H04L 5/14* (2006.01)
*H04W 72/1273* (2023.01)

(52) U.S. Cl.
CPC ....... *H04W 72/1273* (2013.01); *H04L 5/0053* (2013.01); *H04L 5/1469* (2013.01); *H04W 72/0446* (2013.01)

(58) Field of Classification Search
CPC .......... H04W 72/1273; H04W 72/0446; H04L 5/0053; H04L 5/1469
See application file for complete search history.

(56) References Cited

U.S. PATENT DOCUMENTS

2018/0279274 A1* 9/2018 Sun ............... H04W 52/367
2021/0243780 A1 8/2021 Han et al.
2022/0399979 A1* 12/2022 Gao ............... H04L 5/0055
(Continued)

OTHER PUBLICATIONS

Vivo, "HARQ-ACK enhancements for Rel-17 URLLC", R1-2005374, 3GPP TSG RAN WG1 #102-e, e-Meeting, Aug. 17-28, 2020, 3 pages, Retrieved from the Internet—URL: https://www.3gpp.org/ftp/tsg_ran/WG1_RL1/TSGR1_102-e/Docs/R1-2005374.zip, [Retrieved from the Internet on Sep. 16, 2020] (Year: 2020).*

(Continued)

*Primary Examiner* — Kent Krueger
(74) *Attorney, Agent, or Firm* — Patterson & Sheridan, L.L.P.

(57) ABSTRACT

Aspects of the present disclosure relate to wireless communications, and more particularly, to mechanisms for using block acknowledgments to acknowledge semi-persistently scheduled (SPS) occasions from multiple SPS configurations. An example method generally includes determining that a slot scheduled for reporting acknowledgment feedback for an SPS physical downlink shared channel (PDSCH) potentially overlaps with at least one downlink or flexible symbol, deciding whether to cancel or to delay reporting the acknowledgment feedback to a network entity based on one or more conditions, and canceling or delaying reporting the acknowledgment feedback to the network entity, in accordance with the decision.

24 Claims, 12 Drawing Sheets

(56) References Cited

U.S. PATENT DOCUMENTS

2023/0370209 A1* 11/2023 Wang .................. H04L 5/14
2024/0015723 A1* 1/2024 Yang .................. H04W 72/11

OTHER PUBLICATIONS

CATT: "Discussion on PUSCH Resource Collision and DL SPS Enhancement", 3GPP TSG RAN WG1 Meeting #99, 3GPP Draft, R1-1912174, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), 7 Pages, XP051823252, Retrieved from the Internet: URL: https://www.3gpp.org/ftp/tsg_ran/wg1_rl1/TSGR1_99/Docs/R1-1912174.zip, R1-1912174.docx, [retrieved on Nov. 9, 2019], The whole document.
International Search Report and Written Opinion—PCT/US2021/052389—ISA/EPO—Jan. 26, 2022.
Vivo: "HARQ-ACK Enhancements for Rel-17 URLLC" 3GPP Draft, 3GPP TSG RAN WG1#102-e, R1-2005374, 3rd Generation Partnership Project (3GPP), Mobile Competence Centre, 650, Route Des Lucioles, F-06921, Sophia-Antipolis Cedex, France, vol. RAN WG1, No. e-Meeting; Aug. 17, 2020-Aug. 28, 2020, Aug. 8, 2020 (Aug. 8, 2020), XP051917399, 2 pages.

* cited by examiner

CONDITIONS TO DELAY HARQ-ACK FOR SPS PDSCH

CROSS-REFERENCE TO RELATED APPLICATIONS

This application claims benefits of and priority to U.S. Provisional Patent Application No. 63/084,535, filed on Sep. 28, 2020, which is assigned to the assignee hereof and herein incorporated by reference in the entirety as if fully set forth below and for all applicable purposes.

INTRODUCTION

Field

Aspects of the present disclosure relate to wireless communications, and more particularly, to mechanisms and techniques to delay or cancel reporting acknowledgement feedback to a network entity based on various conditions.

BACKGROUND

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communications system may include a number of base stations, each simultaneously supporting communications for multiple communications devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communications system may include a number of distributed units (DUs) (e.g., edge units (EUs), edge nodes (ENs), radio heads (RHs), smart radio heads (SRHs), transmission reception points (TRPs), etc.) in communications with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Aspects of the present disclosure relate to wireless communications, and more particularly, to mechanisms and techniques for conditions to delay or cancel reporting acknowledgement feedback to a network entity based on various conditions.

Certain aspects of the present disclosure provide a method for wireless communications by a user equipment (UE). The method generally includes determining that a slot scheduled for reporting acknowledgment feedback for a semi-persistently scheduled (SPS) physical downlink shared channel (PDSCH) potentially overlaps with at least one downlink or flexible symbol, deciding whether to cancel or to delay reporting the acknowledgment feedback to a network entity based on one or more conditions related to a cause of the overlap, and canceling or delaying reporting the acknowledgment feedback to the network entity, in accordance with the decision.

Certain aspects of the present disclosure provide a method for wireless communications by a network entity. The method generally includes determining that a slot scheduled for a UE to report acknowledgment feedback for an SPS PDSCH potentially overlaps with at least one downlink or flexible symbol, and deciding whether to monitor for the UE to delay reporting the acknowledgment feedback based on one or more conditions related to a cause of the overlap.

Certain aspects of the present disclosure provide an apparatus (e.g., a UE) for wireless communications. The apparatus includes at least one processor and a memory configured to determine that a slot scheduled for reporting acknowledgment feedback for an SPS PDSCH potentially overlaps with at least one downlink or flexible symbol. The at least one processor and the memory are further configured to decide whether to cancel or to delay reporting the acknowledgment feedback to a network entity based on one or more conditions related to a cause of the overlap. The at least one processor and memory are then configured to cancel or delay reporting the acknowledgment feedback to the network entity, in accordance with the decision.

Certain aspects of the present disclosure provides an apparatus (e.g., a network entity) for wireless communications. The apparatus includes at least one processor and a memory configured to determine that a slot scheduled for a UE to report acknowledgment feedback for an SPS PDSCH potentially overlaps with at least one downlink or flexible symbol. The at least one processor and the memory are further configured to decide whether to monitor for the UE to delay reporting the acknowledgment feedback based on one or more conditions related to a cause of the overlap.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
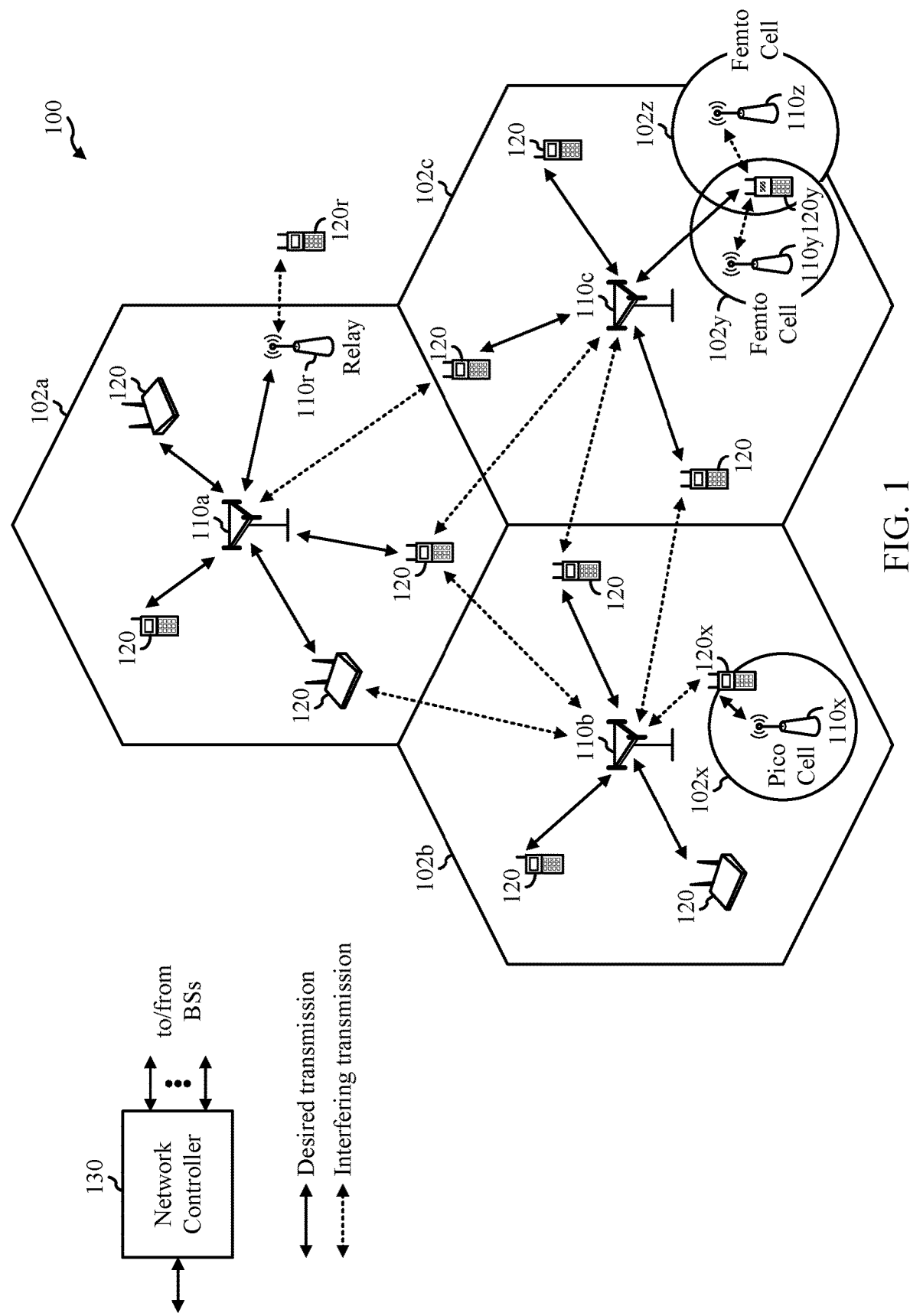
FIG. 1 is a block diagram conceptually illustrating an example telecommunications system, in accordance with certain aspects of the present disclosure.

Aspects of the present disclosure relate to wireless communications, and more particularly, to mechanisms and techniques to delay or cancel reporting acknowledgement feedback to a network entity based on various conditions. For example, a user equipment (UE) may determine that a slot scheduled for reporting acknowledgement feedback for a semi-persistently scheduled (SPS) physical downlink shared channel (PDSCH) that potentially overlaps with at least one downlink or flexible symbol. The UE decides whether to cancel or to delay reporting the acknowledgement feedback to a network entity based on one or more conditions related to a cause of the overlap. The UE then cancels or delays reporting the acknowledgement feedback to the network entity in accordance to the decision.

The present disclosure enhances acknowledgement feedback, such as the SPS hybrid automatic repeat request (HARQ) acknowledgement (ACK) feedback. For example, when a slot scheduled for reporting HARQ-ACK for the SPS is a downlink slot or overlapping with at least one downlink symbols, the UE may not transmit the HARQ-ACK in the scheduled slot and results in wasting system resources (e.g., causing misunderstanding between the UE and the network and requiring retransmissions that waste system resources). The present disclosure provides various conditions for the UE to delay or cancel the HARQ-ACK feedback in different cases. As such, the issues of misunderstanding may be avoided or minimized, and delaying or canceling the HARQ-ACK feedback may avoid the related system resource waste.

Aspects of the present disclosure provide apparatus, methods, processing systems, and computer readable mediums for new radio (NR) (new radio access technology or 5G technology). NR may support various wireless communications services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep"

through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communications networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communications systems, such as 5G and later, including NR technologies.

Example Wireless System

FIG. 1 illustrates an example wireless network 100 in which aspects of the present disclosure may be performed.

Figure 9:
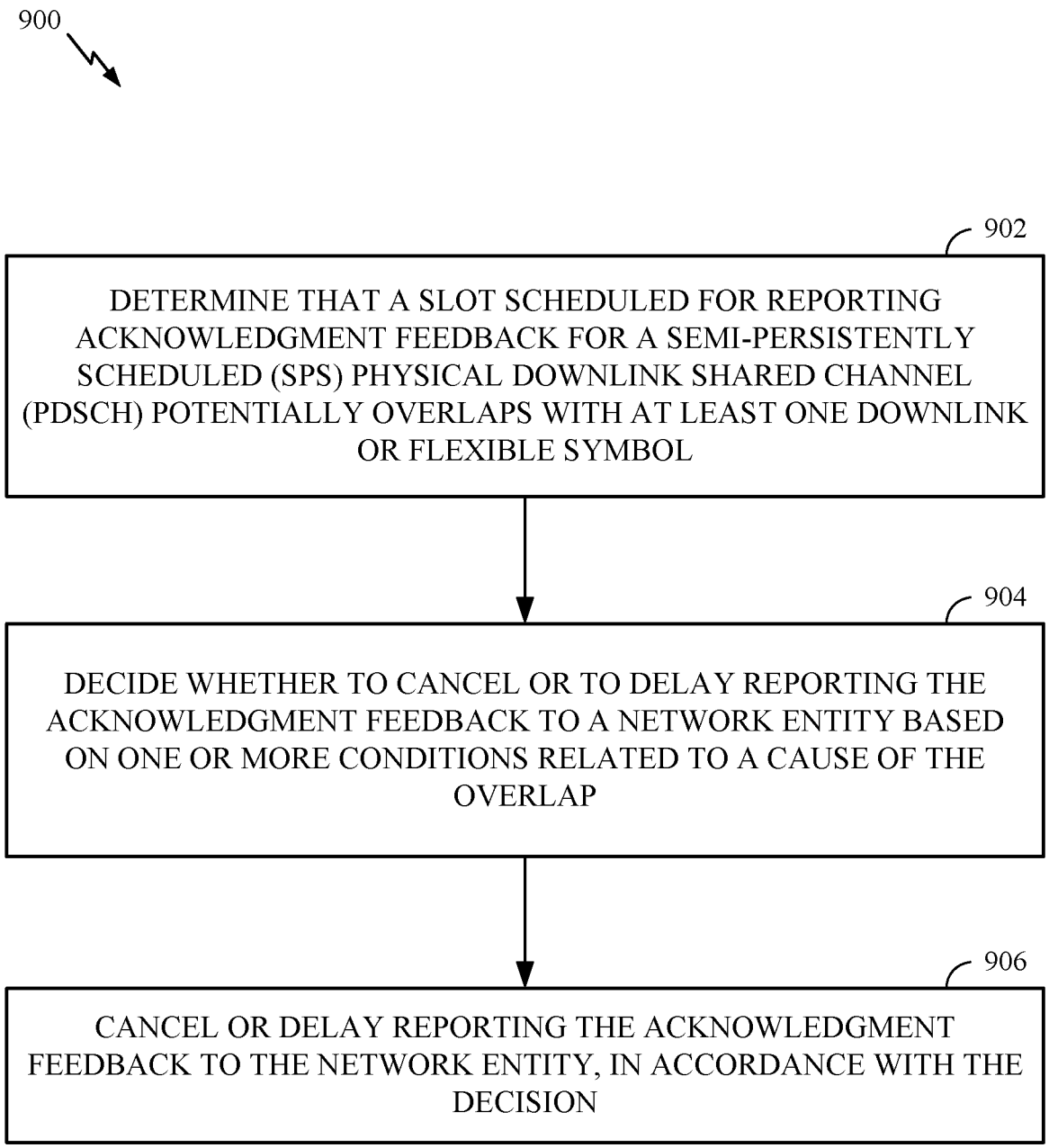
FIG. 9 is a flow diagram of example operations that may be performed by a user equipment (UE), in accordance with aspects of the present disclosure.

For example, one or more UEs 120 of the wireless network 100 may be configured to perform operations 900 of FIG. 9 for delaying or canceling reporting acknowledgement (ACK) feedback to a network entity based on various conditions. Similarly, a base station 110 of the wireless network 100 may be configured to perform operations 1000 of FIG. 10 to determine whether to monitor for the delayed ACK feedback sent by a UE 120 (performing operations 900 of FIG. 9).

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communications coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communications coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communications between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communications. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communications network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
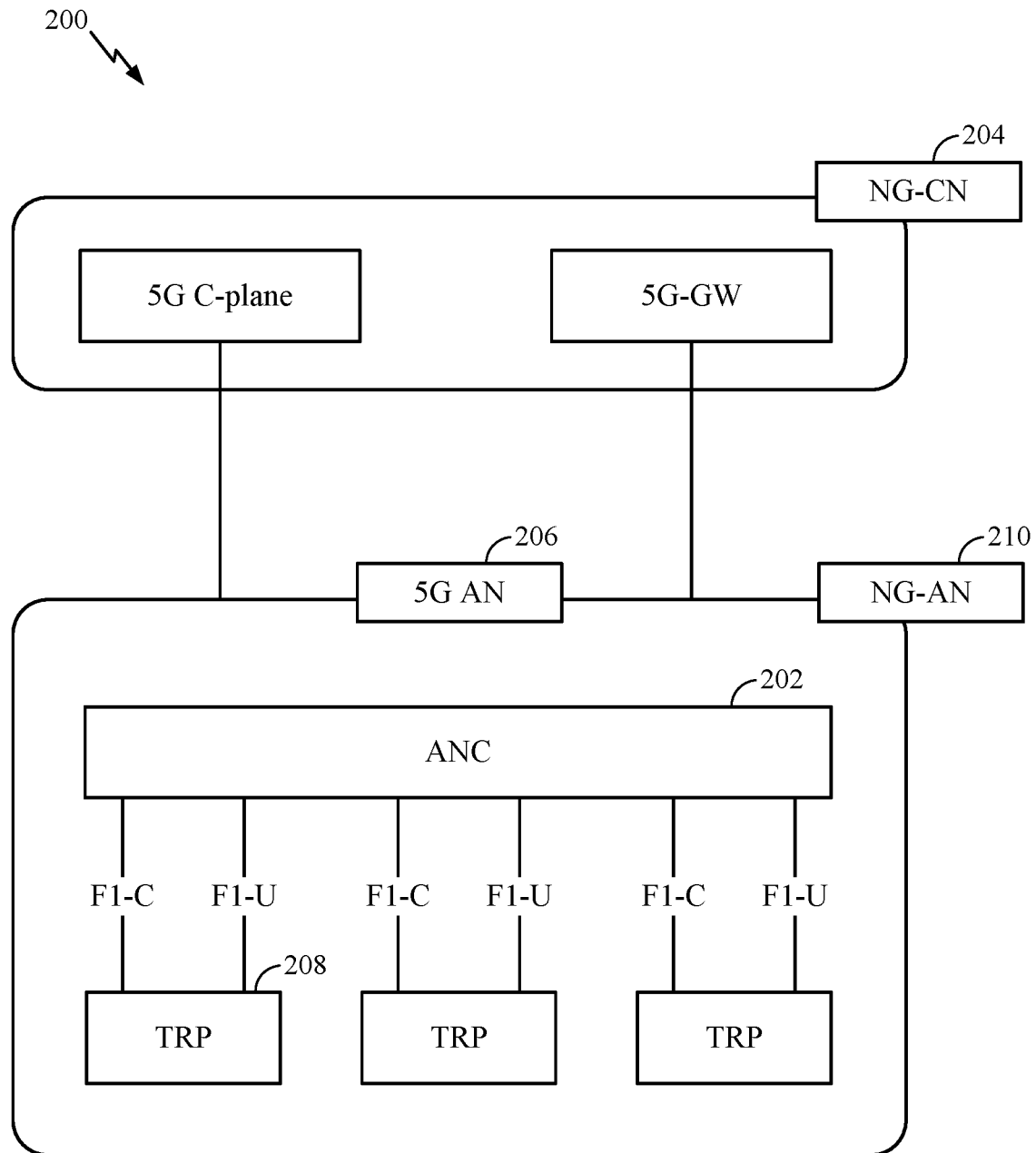
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communications system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
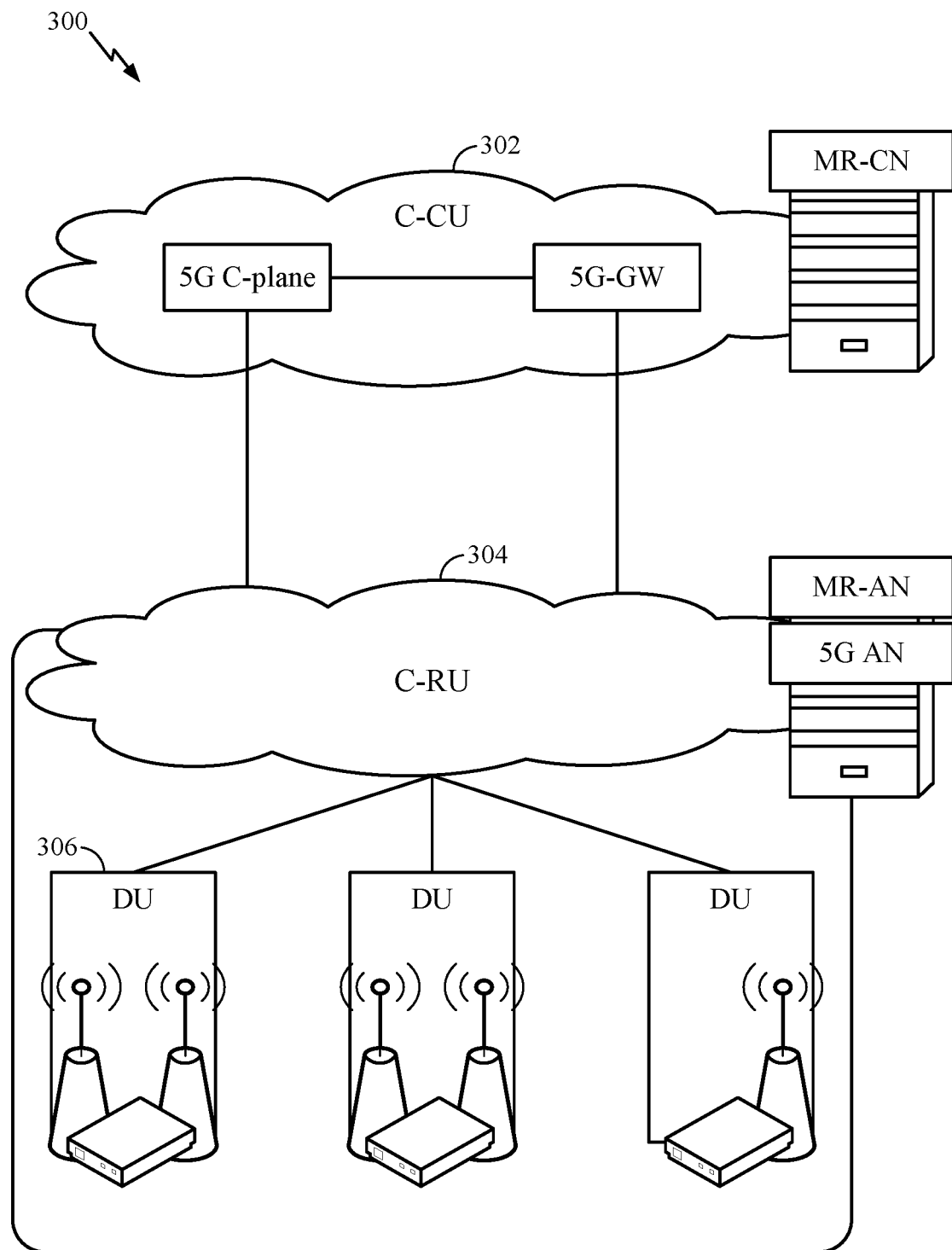
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
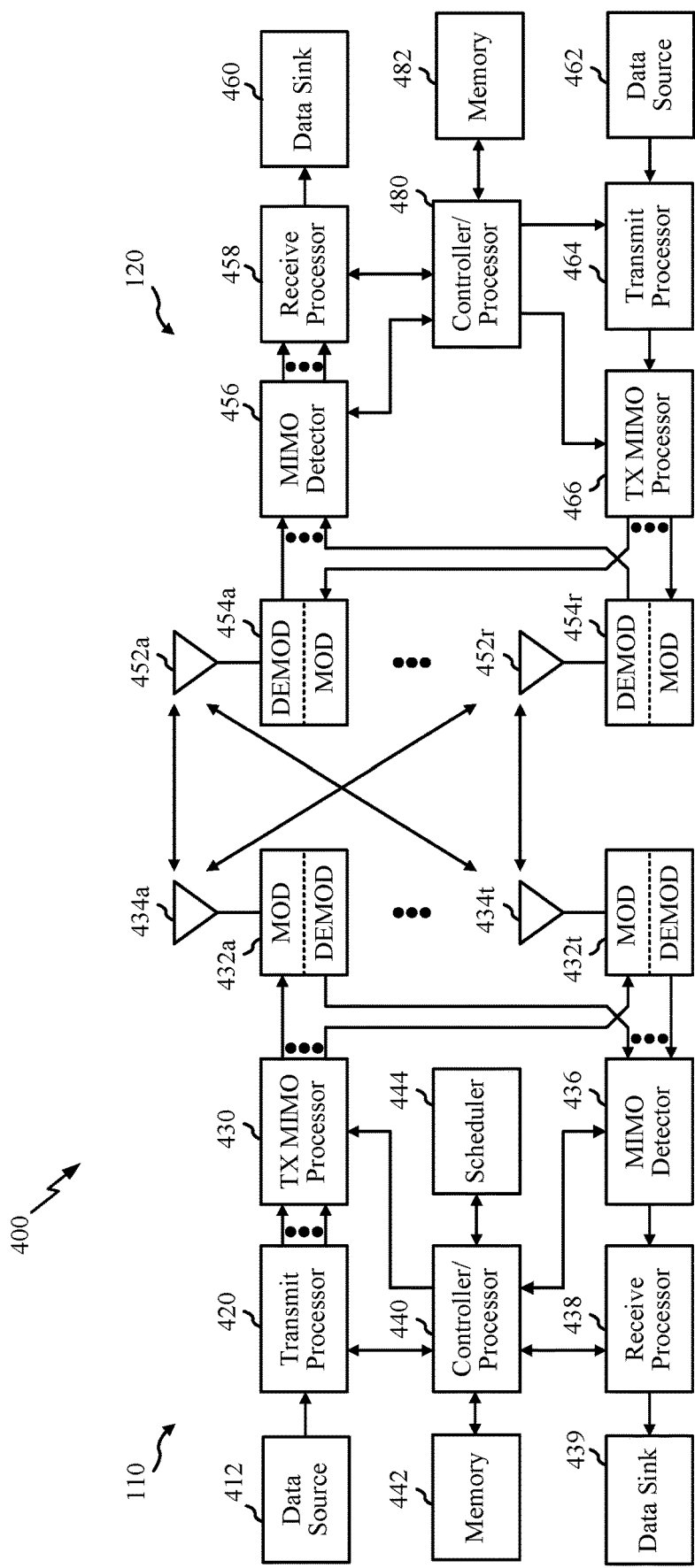
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

As an example, one or more of the antennas 452, DEMOD/MOD 454, processors 466, 458, 464, and/or controller/processor 480 of the UE 120 may be configured to perform the operations described herein (e.g., operations 900 of FIG. 9). Similarly, one or more of the 434, DEMOD/MOD 432, processors 430, 420, 438 and/or controller/processor 440 of the BS 110 may be configured to perform the operations described herein (e.g., operations 1000 of FIG. 10).

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 8 and/or other processes for the techniques described herein and those illustrated in the appended drawings. The processor 440 and/or other processors and modules at the BS 110 may perform or direct processes for the techniques described with reference to FIG. 9 and/or other processes for the techniques described herein and those illustrated in the appended drawings. The memories 442 and 482 may store data and program codes for the BS 110 and the UE 120, respectively.

Figure 5:
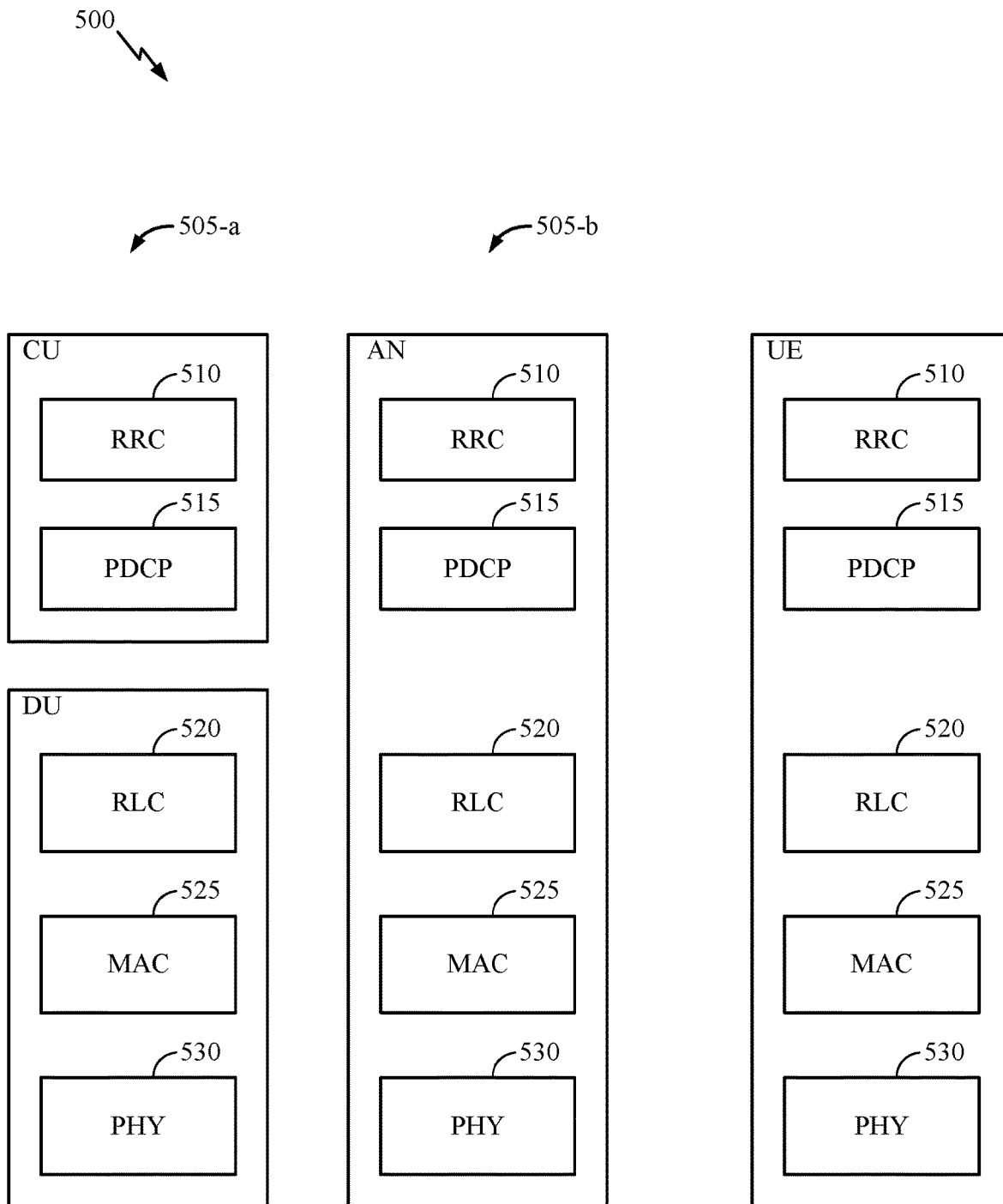
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
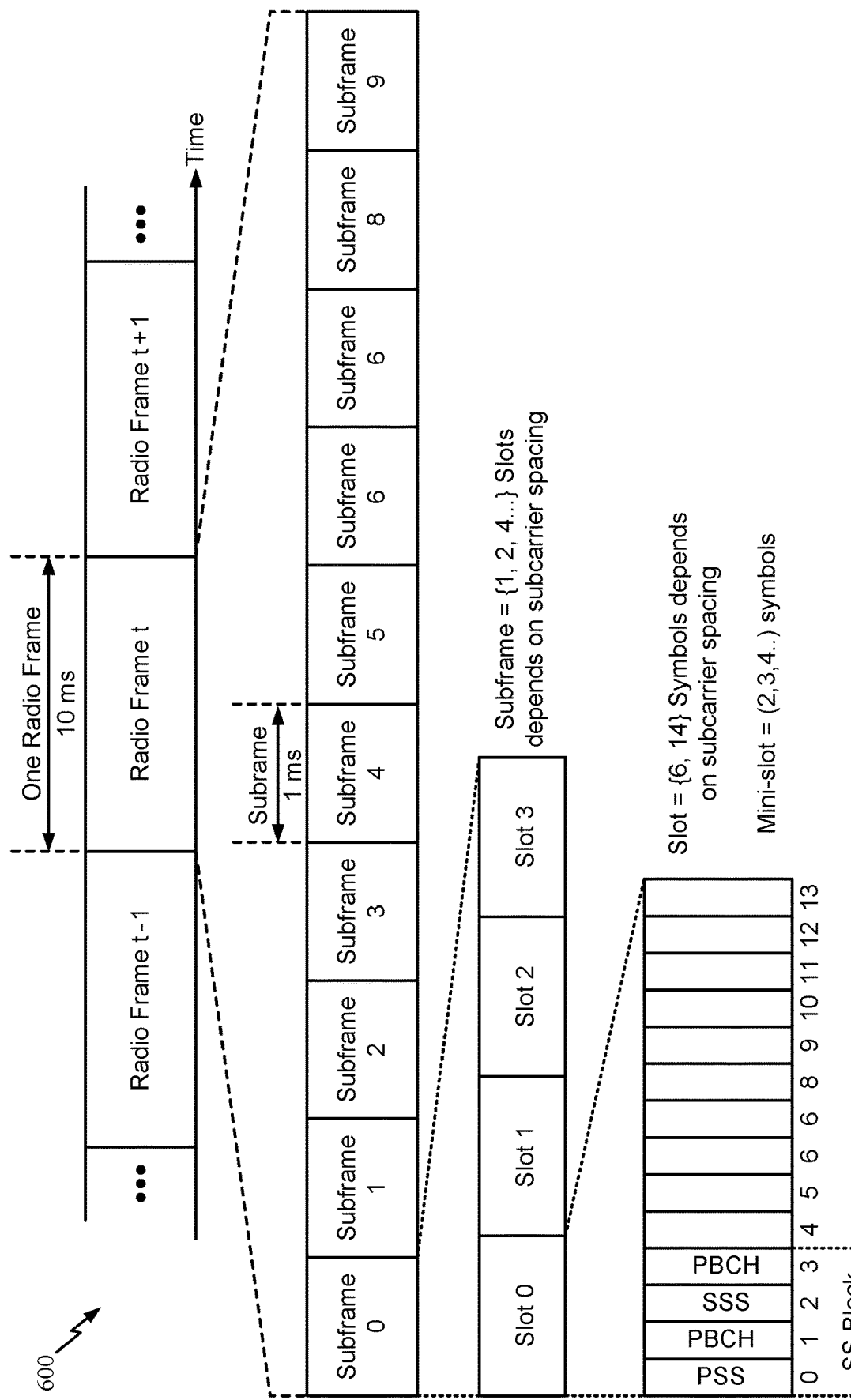
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof.

Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SPS PDSCH Configuration

Semi-persistent scheduling (SPS) resource allocation, which is sometimes called configured downlink assignment, refers to a scheduling technique where a user-equipment (UE) is pre-configured by the network/base station (e.g., eNBs, gNB, etc.) with a periodicity and an offset.

Figure 7:
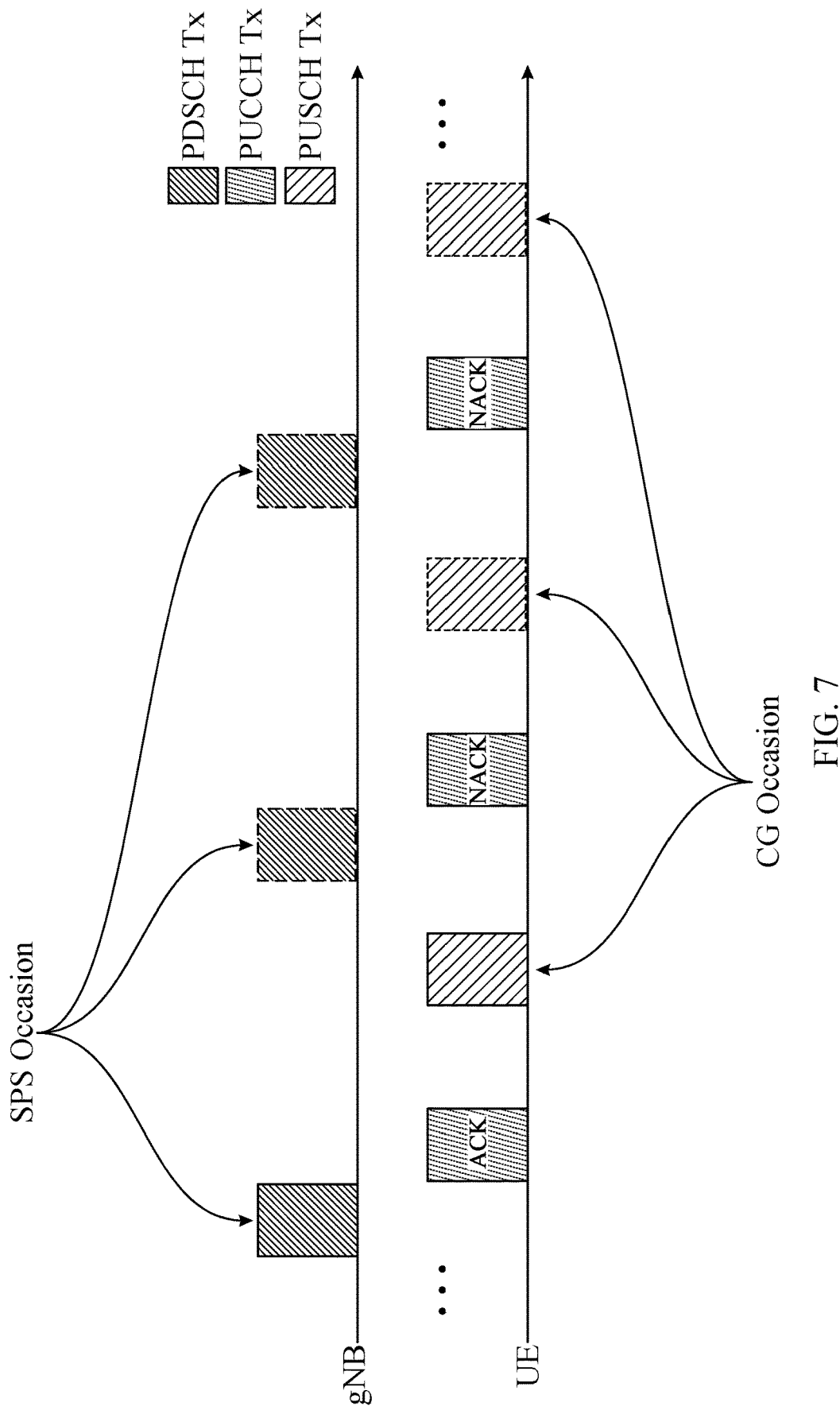
FIG. 7 illustrates an example of semi-persistent scheduled (SPS) PDSCH occasions that may be used to activate configured grant (CG) occasions.

As illustrated in FIG. 7, once pre-configured, if the UE were to receive an allocation of downlink resources, then the allocation of SPS occasions would repeat according to the pre-configured periodicity, resulting in periodic SPS occasions. For SPS, the base station may use Radio Resource Control (RRC) signaling to define the periodicity of configured downlink assignments. Similarly, once configured with CG occasions, the allocation of CG occasions may repeat according to the pre-configured periodicity.

As used herein, the term occasion generally refers to a time in which resource are allocated for a transmission that may or may not ultimately happen. For example, a downlink transmission may or may not occur in an SPS occasions. Similarly, an uplink transmission may or may not occur in a CG occasion. Occasions may be considered activated if the transmission may occur and, thus, those occasions should be monitored.

Example Conditions to Delay HARD ACK for SPS PDSCH

Aspects of the present disclosure relate to wireless communications, and more particularly, to mechanisms and techniques to delay or cancel reporting acknowledgement feedback to a network entity based on various conditions.

Currently, new radio (NR) may provide support for downlink (DL) SPS for periodic traffic. For a time division duplexed (TDD) system (e.g., in Rel-15 and/or Rel-16) if a slot scheduled for reporting hybrid automatic repeat request (HARQ) acknowledgement (ACK) for the SPS is a DL slot, or overlapping with at least one DL symbol, the UE will not transmit the HARQ-ACK. This may result in a waste of system resource(s), since the gNB may need to retransmit the SPS PDSCH again due to missed a HARQ-ACK report.

The overlap between the slot scheduled for reporting HARQ ACK and the at least one DL symbol or DL slot may be due to various reasons. For example, the DL slot/symbols could be semi-statically configured to be DL, or the slots/symbols may be converted to DL (or "dynamic flexible") from semi-static "flexible" by a dynamic slot format indicator (SFI) or dynamic DL control information (DCI) (e.g., a DL grant scheduling PDSCH, or a grant scheduling aperiodic channel state information reference signals (CSI-RS) transmission).

Figure 8:
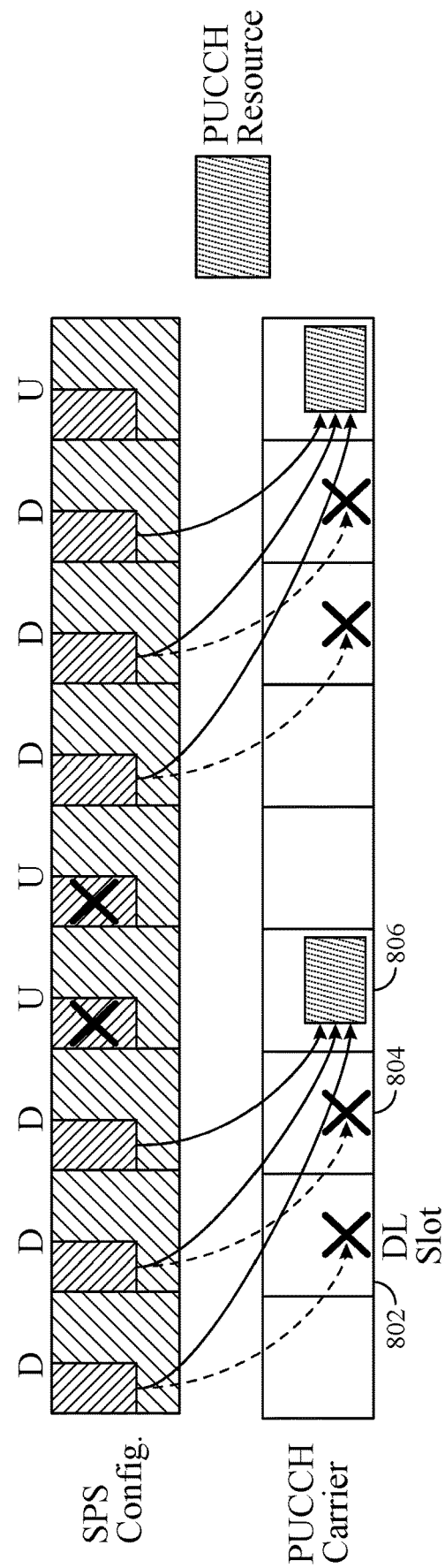
FIG. 8 illustrates an example timeline of delayed hybrid automatic repeat request (HARQ) acknowledgement (ACK) feedback, in accordance with aspects of the present disclosure.

In other cases (e.g., in NR Rel-17), the HARQ-ACK feedback for SPS PDSCH may be enhanced by delaying the HARQ-ACK feedback that conflicts with DL symbols/slots (or "dynamic flexible" symbols) to later uplink symbols/ slots. For example, as shown in FIG. 8, which is an example timeline of delayed HARQ-ACK feedback, if an SPS HARQ-ACK cannot be transmitted in a first slot or subslot (e.g., slot 802 and/or 804) due to conflict with DL symbols/ slots, it can be delayed to the next (or a later) slot/subslot (e.g., slot 806).

In NR, the cancellation of HARQ-ACK for SPS PDSCH may be due to a collisions (e.g., resource overlapping) that occur in a number of cases (also referred to as conditions herein). For example, in a first case, the HARQ-ACK may collide with semi-static DL symbols as determined from at least one of the following configurations:

1) Symbols indicated as downlink by TDD-ConfigurationCommon or TDD-UL-DL-ConfigDedicated;
2) Symbols that are indicated to the UE by ssb-PositionInBurst in a system information block (SIB) (e.g., SIB1) or ssb-PositionInBurst in ServingCellConfigCommon for reception of SSB and/or physical broadcast control channel (PBCH) blocks; and/or
3) Symbols that are indicated to the UE to receive control resource set (CORESET) 0 or CORESET for Type0-PDCCH common search space (CSS) set.

In a second case, the HARQ-ACK feedback may collide with semi-static "flexible" symbols, but be switched to DL symbols by a dynamic scheduling DCI for the UE to receive a dynamic PDSCH (e.g., in a downlink grant) and/or CSI-RS (e.g., in an uplink or downlink grant). In this case, if the UE misses (e.g., fails to receive) the DCI, then there may be a misunderstanding between the UE and the BS regarding the symbol directions (e.g., UL or DL).

In a third case, the HARQ-ACK feedback may collide with semi-static flexible symbols, but later switched to DL or "flexible" by a dynamic SFI indicator (e.g., DCI format 2_0). In this case, if the UE misses (e.g., fails to receive) the SFI, then there again may be a misunderstanding between the UE and the BS regarding the symbol directions (e.g., UL or DL).

In a fourth case, the UE may be configured to monitor SFI for a set of (one or more) semi-static flexible symbols. The UE may further be configured such that, if the UE does not detect SFI during any symbol in the symbols, then the UE may cancel the HARQ-ACK feedback.

When the UE and the BS misunderstand each other due to missing the DCI as in the second case or the SFI as in the third case, the BS may expect the UE to cancel the HARQ-ACK feedback for SPS, but the UE may still transmit the HARQ-ACK feedback for SPS during a particular symbol/ slot/subslot. If the HARQ-ACK feedback is delayed, then both the HARQ-ACK feedback in the current slot and the HARQ-ACK feedback in the next slot (e.g., UL slot) may be affected, causing error propagation. Typically, a scheduling DCI may be more reliable than a dynamic SFI, because a dynamic SFI is a group-common DCI. Generally it is more difficult for a BS to ensure that every UE in the group receives the SFI correctly than to ensure that one UE receives its scheduling DCI correctly. Therefore, either missing SFI or DCI may cause misunderstanding between the BS and the UE.

Aspects of the present disclosure, however, provide mechanisms and techniques for delaying and/or canceling HARQ-ACK reports to a network entity to avoid issues caused by overlaps/collisions or reception failures. For example, in various conditions (e.g., the conditions discussed above), the UE may correspondingly delay and/or cancel HARQ-ACK feedback associated with an SPS PDSCH to a network entity, which may result in more efficient use of system resources (and less waste), such as by avoiding misunderstanding and/or unnecessary retransmissions.

FIG. 9 illustrates example operations 900 for wireless communications by a UE. Operations 900 may be performed, for example, by a UE (e.g., UE 120 of FIGS. 1 and 4) to determine whether to cancel or delay HARQ-ACK feedback for SPS PDSCH.

Operations 900 begin, at 902, by determining that a slot scheduled for reporting acknowledgment feedback for an SPS PDSCH potentially overlaps with at least one downlink or flexible symbol. For example, in the slot, one or more symbols of a physical uplink control channel (PUCCH) scheduled to transmit the HARQ-ACK feedback for the SPS may overlap with a downlink symbol or a flexible symbol.

At 904, the UE decides whether to cancel or to delay reporting the acknowledgment feedback to a network entity based on one or more conditions related to a cause of the overlap. At 906, the UE cancels or delays reporting the acknowledgment feedback to the network entity, in accordance with the decision.

Figure 10:
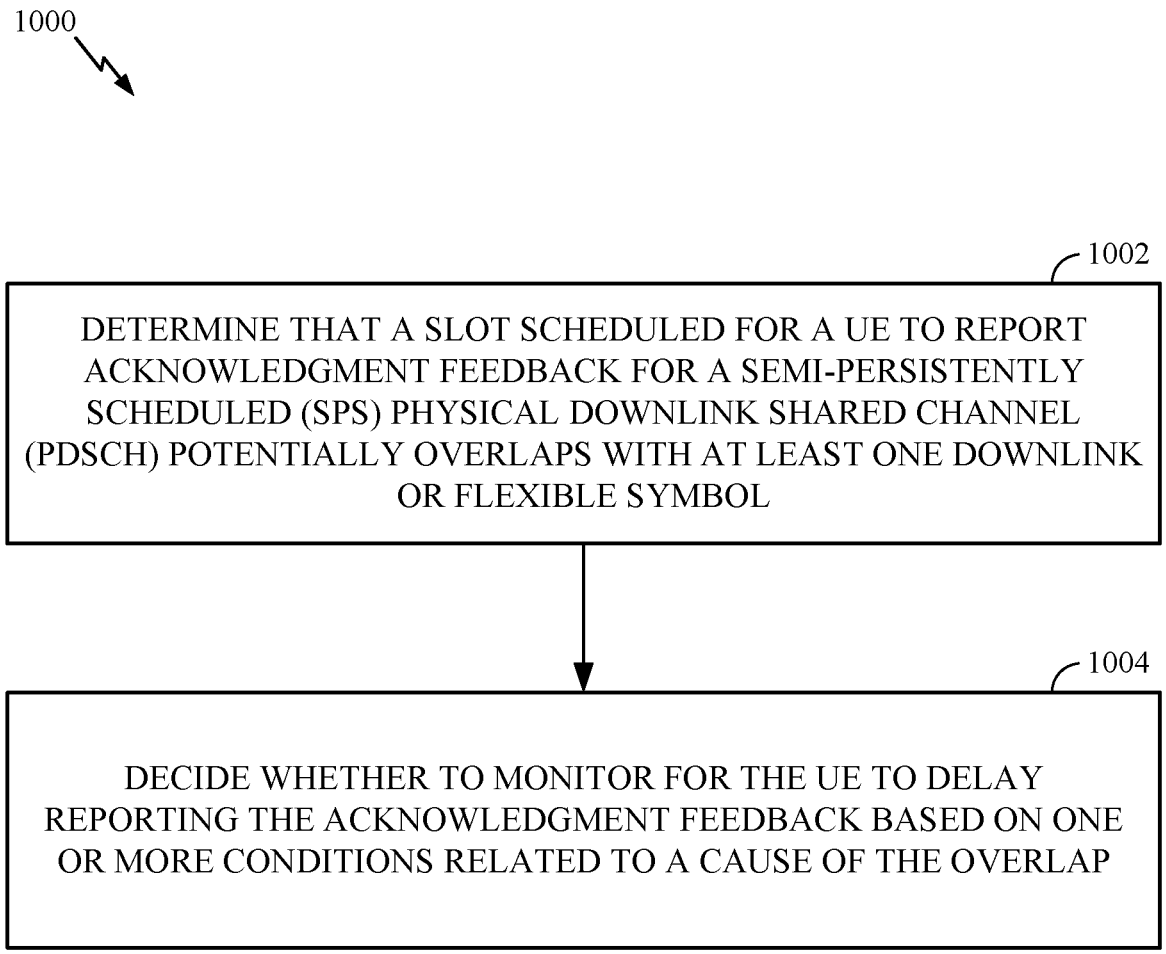
FIG. 10 is a flow diagram of example operations that may be performed by a network entity, in accordance with aspects of the present disclosure.

FIG. 10 illustrates example operations 1000 that may be considered complementary to operations 900 of FIG. 9. For example, operations 1000 may be performed by a gNB (e.g., BS 110 of FIGS. 1 and 4) to determine whether to monitor for delayed ACK feedback for SPS PDSCH from a UE (e.g., a UE performing operations 900 of FIG. 9).

Operations 1000 begin, at 1002, by determining that a slot scheduled for a UE to report acknowledgment feedback for an SPS PDSCH potentially overlaps with at least one downlink or flexible symbol. At 1004, the network entity decides whether to monitor for the UE to delay reporting the acknowledgment feedback based on one or more conditions related to a cause of the overlap.

The one or more conditions that result in the UE canceling and/or delaying the reporting of acknowledgment feedback may relate to the cases described above.

According to one general aspect of the present disclosure, the UE may delay (e.g., defer) a HARQ-ACK feedback for SPS PDSCH (e.g., to the next available slot/subslot) if the scheduled HARQ-ACK feedback conflicts with semi-static DL symbols (e.g., the first case described above). The UE, however, may not delay a HARQ-ACK feedback for SPS PDSCH if the HARQ-ACK feedback would be cancelled due to a dynamic scheduling DCI (e.g., the second case described above), or due to a dynamic SFI (e.g., the third case and/or fourth case described above). A benefit of this approach when the UE does not detect the scheduling DCI or the dynamic SFI (e.g., the second, third, or fourth case described above), is that by cancelling the HARQ-ACK feedback without delaying to the next slot, only the HARQ-ACK feedback in the current slot is affected, thus preventing error propagation.

According to a second general aspect of the present disclosure, the UE may delay a HARQ-ACK for SPS PDSCH if the HARQ-ACK is cancelled by semi-static DL symbols (e.g., the first case) or cancelled by a dynamic scheduling DCI (e.g., the second case), but UE may not delay a cancelled HARQ-ACK for SPS PDSCH if it is canceled by a dynamic SFI (e.g., the third or fourth case). If the SPS PDSCH is canceled by the dynamic SFI (e.g., the third or fourth case), the UE may cancel the transmission of HARQ-ACK for SPS PDSCH. Similar to the benefits mentioned above, by sending the HARQ-ACK feedback in a subsequent slot, regardless if the UE misses the scheduling DCI or dynamic SFI, only the HARQ-ACK feedback in the current slot is affected.

According to a third general aspect of the present disclosure, a network entity (e.g., gNB) may configure the UE to either delay (or not delay) the HARQ-ACK for SPS PDSCH when any one or more of the conditions (e.g., the first, second, third, or fourth cases) described above occurs.

For example, a network entity may decide to enable the delayed HARQ-ACK due to a conflict (e.g., an overlap) with a scheduling DCI (e.g., a downlink grant or an uplink grant), but not enable delayed HARQ-ACK due to a conflict with a dynamic SFI. This may be the case if the network entity can guarantee the reliability of dynamic scheduling DCI (but not the dynamic SFI). In this case, missing (failing to receive) dynamic scheduling DCI may not impact the overall reliability in a significant manner. Furthermore, missing (e.g., failing to receive) the dynamic scheduling DCI may only affect the HARQ-ACK transmission in the current slot, but not affect the HARQ-ACK transmission in any subsequent slot(s).

As another example, a network entity may disable the delayed HARQ-ACK due to a conflict with either scheduling DCI or dynamic SFI (e.g., if the network entity determines that neither of them are reliable). In certain aspects, for each of the cases described above, the network entity may configure the UE (e.g., via radio resource control (RRC) signaling) whether to cancel or delay the HARQ-ACK feedback for each of the four cases/conditions described above separately. That is, for each case, the UE may follow the RRC configuration to determine whether to delay or cancel the HARQ-ACK feedback for each corresponding condition.

Figure 11:
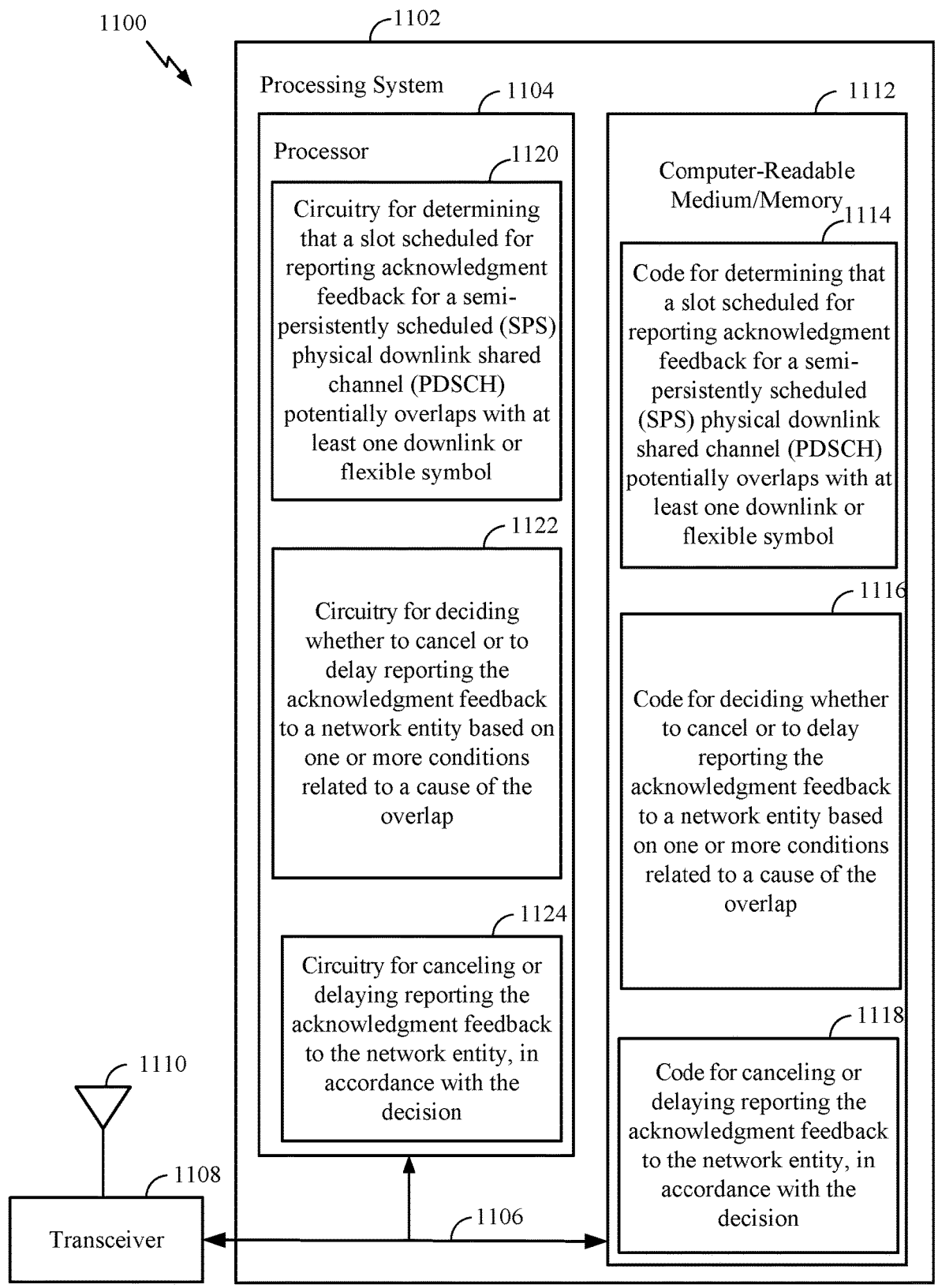
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein. In certain aspects, computer-readable medium/memory 1112 stores code 1114 for determining that a slot scheduled for reporting acknowledgment feedback for an SPS PDSCH potentially overlaps with at least one downlink or flexible symbol; code 1116 for deciding whether to cancel or to delay reporting the acknowledgment feedback to a network entity based on one or more conditions related to a cause of the overlap; and code 1118 for canceling or delaying reporting the acknowledgment feedback to the network entity, in accordance with the decision. In certain aspects, the processor 1104 has circuitry configured to implement the code stored in the computer-readable medium/memory 1112. The processor 1104 includes circuitry 1120 for determining that a slot scheduled for reporting acknowledgment feedback for an SPS PDSCH potentially overlaps with at least one downlink or flexible symbol; circuitry 1122 for deciding whether to cancel or to delay reporting the acknowledgment feedback to a network entity based on one or more conditions related to a cause of the overlap; and circuitry 1124 for canceling or delaying reporting the acknowledgment feedback to the network entity, in accordance with the decision.

Figure 12:
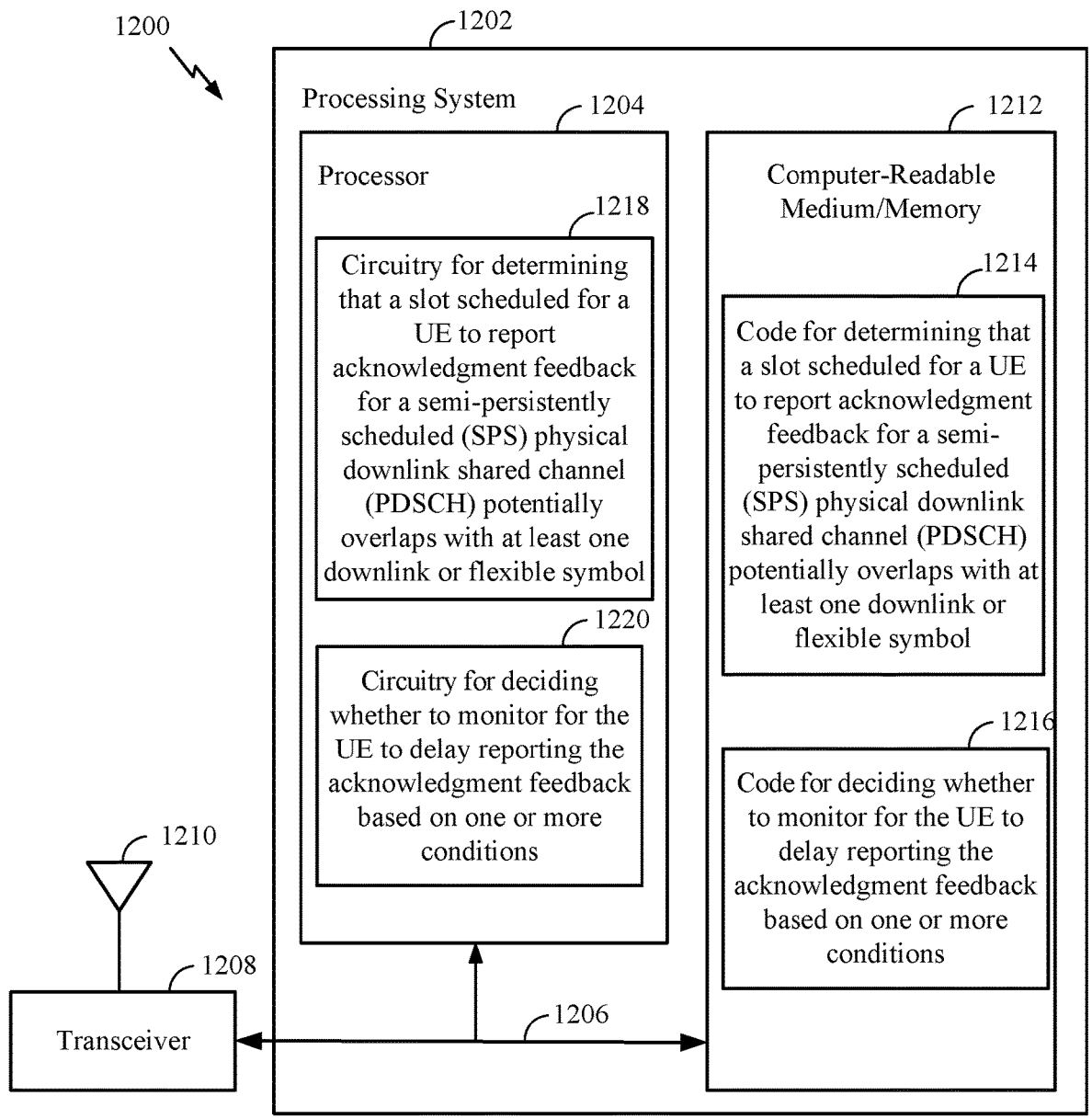
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein. In certain aspects, computer-readable medium/memory 1212 stores code 1214 for determining that a slot scheduled for a UE to report acknowledgment feedback for an SPS PDSCH potentially overlaps with at least one downlink or flexible symbol; and code 1216 for deciding whether to monitor for the UE to delay reporting the acknowledgment feedback based on one or more conditions related to a cause of the overlap. In certain aspects, the processor 1204 has circuitry configured to implement the code stored in the computer-readable medium/memory 1212. The processor 1204 includes circuitry 1218 for determining that a slot scheduled for a UE to report acknowledgment feedback for an SPS PDSCH potentially overlaps with at least one downlink or flexible symbol; and circuitry 1220 for deciding whether to monitor for the UE to delay reporting the acknowledgment feedback based on one or more conditions related to a cause of the overlap.

Example Aspects

Aspect 1: A method for wireless communications by a user equipment (UE), comprising determining that a slot scheduled for reporting acknowledgment feedback for a semi-persistently scheduled (SPS) physical downlink shared channel (PDSCH) potentially overlaps with at least one downlink or flexible symbol, deciding whether to cancel or to delay reporting the acknowledgment feedback to a network entity based on one or more conditions related to a cause of the overlap, and canceling or delaying reporting the acknowledgment feedback to the network entity, in accordance with the decision.

Aspect 2: The method of Aspect 1, wherein the one or more conditions comprise at least one of: a first condition where the overlap is due to signaling indicating semi-static downlink symbols via time division duplexing (TDD) configuration, synchronization signal block (SSB) configuration, or control resource set (CORESET) configuration signaling; a second condition where the overlap is due to a downlink control information (DCI) switching one or more semi-static flexible symbols to downlink symbols; a third condition where the overlap is due to a slot format indicator (SFI) indicating one or more semi-static flexible symbols as downlink or flexible symbols; or a fourth condition where the UE fails to receive an SFI.

Aspect 3: The method of Aspect 2, wherein the decision is to cancel reporting in the scheduled slot and to delay reporting the acknowledgment feedback to a next available slot or subslot if the first condition is met.

Aspect 4: The method of Aspect 3, wherein the decision is to cancel reporting the acknowledgment feedback if either of the second, third, or fourth conditions is met.

Aspect 5: The method of any of Aspects 1-4, wherein the decision is to delay reporting the acknowledgment feedback to a next available slot or subslot if either of the first or second condition is met.

Aspect 6: The method of Aspect 5, wherein the decision is to cancel reporting the acknowledgment feedback if either of the third or fourth condition is met.

Aspect 7: The method of any of Aspects 1-6, wherein the decision whether to delay or cancel reporting the acknowledgment feedback if one or more of the conditions is met is based on a configuration signaled to the UE.

Aspect 8: The method of Aspect 7, wherein the configuration configures the UE whether to cancel or to delay reporting the acknowledgment feedback when the first condition is met.

Aspect 9: The method of any of Aspects 1-8, wherein the configuration configures the UE whether to cancel or to delay reporting the acknowledgment feedback when the second condition is met.

Aspect 10: The method of any of Aspects 1-9, wherein the configuration configures the UE whether to cancel or to delay reporting the acknowledgment feedback when the third condition is met.

Aspect 11: The method of any of Aspects 1-10, wherein the configuration configures the UE whether to cancel or to delay reporting the acknowledgment feedback when the fourth condition is met.

Aspect 12: The method of any of Aspects 1-11, wherein the configuration configures the UE whether to cancel or to delay reporting the acknowledgment feedback when either of the third or fourth condition is met.

Aspect 13: The method of any of Aspects 1-12, wherein the configuration configures the UE to: delay reporting the acknowledgement feedback if the second condition is met; or cancel reporting the acknowledgement feedback if the third or fourth condition is met.

Aspect 14: The method of any of Aspects 1-13, wherein the configuration configures the UE to: cancel reporting the acknowledgement feedback if either of the third or fourth condition is met.

Aspect 15: A method for wireless communications by a network entity, comprising: determining that a slot scheduled for a UE to report acknowledgment feedback for a semi-persistently scheduled (SPS) physical downlink shared channel (PDSCH) potentially overlaps with at least one downlink or flexible symbol; and deciding whether to monitor for the UE to delay reporting the acknowledgment feedback based on one or more conditions related to a cause of the overlap.

Aspect 16: The method of Aspect 15, wherein the one or more conditions comprise at least one of: a first condition where the overlap is due to signaling indicating semi-static downlink symbols via time division duplexing (TDD) configuration, synchronization signal block (SSB) configuration, or control resource set (CORESET) configuration signaling; a second condition where the overlap is due to a downlink control information (DCI) switching one or more semi-static flexible symbols to downlink symbols; a third condition where the overlap is due to a slot format indicator (SFI) indicating one or more semi-static flexible symbols as downlink or flexible symbols; or a fourth condition where the UE fails to receive an SFI.

Aspect 17: The method of Aspect 16, wherein the decision is to not monitor for the UE to report the acknowledgment feedback in the scheduled slot and to monitor for the UE to delay reporting the acknowledgment feedback to a next available slot or subslot if the first condition is met.

Aspect 18: The method of Aspect 17, wherein the decision is to not monitor for the UE to delay reporting the acknowledgment feedback if either of the second, third, or fourth conditions is met.

Aspect 19: The method of any of Aspects 15-18, wherein the decision is to monitor for the UE to delay reporting the acknowledgment feedback to a next available slot or subslot if either of the first or second condition is met.

Aspect 20: The method of Aspect 19, wherein the decision is to not monitor for the UE to delay reporting the acknowledgment feedback if either of the third or fourth condition is met.

Aspect 21: The method of any of Aspects 15-20, further comprising configuring the UE whether to delay or cancel reporting the acknowledgment feedback if one or more of the conditions is met is based on a configuration signaled to the UE.

Aspect 22: The method of Aspect 21, wherein the configuration configures the UE whether to cancel or to delay reporting the acknowledgment feedback when the first condition is met.

Aspect 23: The method of any of Aspects 15-22, wherein the configuration configures the UE whether to cancel or to delay reporting the acknowledgment feedback when the second condition is met.

Aspect 24: The method of any of Aspects 15-23, wherein the configuration configures the UE whether to cancel or to delay reporting the acknowledgment feedback when the third condition is met.

Aspect 25: The method of any of Aspects 15-24, wherein the configuration configures the UE whether to cancel or to delay reporting the acknowledgment feedback when the fourth condition is met.

Aspect 26: The method of any of Aspects 15-25, wherein the configuration configures the UE whether to cancel or to delay reporting the acknowledgment feedback when either of the third or fourth conditions is met.

Aspect 27: The method of any of Aspects 15-26, wherein the configuration configures the UE to: delay reporting the acknowledgement feedback if the second condition is met; or cancel reporting the acknowledgement feedback if either of the third or fourth condition is met.

Aspect 28: The method of any of Aspects 15-27, wherein the configuration configures the UE to: cancel reporting the acknowledgement feedback if either of the third or fourth condition is met.

Aspect 29: An apparatus for wireless communications by a user equipment (UE), comprising: means for determining that a slot scheduled for reporting acknowledgment feedback for a semi-persistently scheduled (SPS) physical downlink shared channel (PDSCH) potentially overlaps with at least one downlink or flexible symbol; means for deciding whether to cancel or to delay reporting the acknowledgment feedback to a network entity based on one or more conditions related to a cause of the overlap; and means for canceling or delaying reporting the acknowledgment feedback to the network entity, in accordance with the decision.

Aspect 30: An apparatus for wireless communications by a network entity, comprising: means for determining that a slot scheduled for a UE to report acknowledgment feedback for a semi-persistently scheduled (SPS) physical downlink shared channel (PDSCH) potentially overlaps with at least one downlink or flexible symbol; and means for deciding whether to monitor for the UE to delay reporting the acknowledgment feedback based on one or more conditions related to a cause of the overlap.

Aspect 31: An apparatus for wireless communications by a user equipment (UE), comprising: at least one processor and a memory configured to determine that a slot scheduled for reporting acknowledgment feedback for a semi-persistently scheduled (SPS) physical downlink shared channel (PDSCH) potentially overlaps with at least one downlink or flexible symbol; decide whether to cancel or to delay reporting the acknowledgment feedback to a network entity based on one or more conditions related to a cause of the overlap; and cancel or delay reporting the acknowledgment feedback to the network entity, in accordance with the decision.

Aspect 32: An apparatus for wireless communications by a network entity, comprising: at least one processor and a memory configured to determine that a slot scheduled for a UE to report acknowledgment feedback for a semi-persistently scheduled (SPS) physical downlink shared channel (PDSCH) potentially overlaps with at least one downlink or flexible symbol; and decide whether to monitor for the UE to delay reporting the acknowledgment feedback based on one or more conditions related to a cause of the overlap.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 458, 464, 466, and/or controller/processor 480 of the UE 120 and/or processors 420, 430, 438, and/or controller/processor 440 of the BS 110 shown in FIG. 4 may be configured to perform operations 900 of FIG. 9 and operations 1000 of FIG. 10.

Means for receiving may include a receiver such as one or more antennas and/or receive processors illustrated in FIG. 4. Likewise, means for transmitting may include a transmitter such as one or more antennas and/or transmit processors illustrated in FIG. 4. Means for monitory, means for indicating, means for signaling, means for activating, and means for deactivating may include a processing system, which may include one or more processors, such as processors 458, 464, 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. A method for wireless communications by a user equipment (UE), comprising:
   determining that a slot scheduled for reporting acknowledgment feedback for a semi-persistently scheduled (SPS) physical downlink shared channel (PDSCH) overlaps with at least one downlink or flexible symbol;
   deciding to delay reporting the acknowledgment feedback to a network entity if a first condition related to a cause of the overlap is met or to cancel reporting the acknowledgment feedback to the network entity if a second condition related to a cause of the overlap is met; and
   canceling or delaying reporting the acknowledgment feedback to the network entity, in accordance with the decision.

2. The method of claim 1, wherein
   the first condition is considered met if at least one of:
   the overlap is due to signaling indicating semi-static downlink symbols via time division duplexing (TDD) configuration, synchronization signal block (SSB) configuration, or control resource set (CORESET) configuration signaling; or
   the overlap is due to a downlink control information (DCI) switching one or more semi-static flexible symbols to downlink symbols.

3. The method of claim 2, wherein the decision is to delay reporting the acknowledgment feedback to a next available slot or subslot if the first condition is met.

4. The method of claim 1, wherein the second condition is considered met if at least one of:
   the overlap is due to a downlink control information (DCI) switching one or more semi-static flexible symbols to downlink symbols;
   the overlap is due to a slot format indicator (SFI) indicating the one or more semi-static flexible symbols as downlink or flexible symbols; or
   the UE fails to receive the SFI.

5. The method of claim 1, wherein the decision is based on a configuration signaled to the UE.

6. The method of claim 5, wherein the configuration configures the UE to delay reporting the acknowledgment feedback when the first condition is met.

7. The method of claim 5, wherein the configuration configures the UE to cancel reporting the acknowledgment feedback when the second condition is met.

8. The method of claim 5, wherein the configuration configures the UE to cancel or to delay reporting the acknowledgment feedback when the UE fails to receive the SFI.

9. The method of claim 5, wherein the configuration configures the UE to cancel or to delay reporting the acknowledgment feedback when the overlap is due to a slot format indicator (SFI) indicating the one or more semi-static flexible symbols as downlink or flexible symbols.

10. The method of claim 5, wherein the configuration configures the UE to:
    delay reporting the acknowledgement feedback when the overlap is due to a downlink control information (DCI) switching one or more semi-static flexible symbols to downlink symbols; or
    cancel reporting the acknowledgement feedback when the overlap is due to a slot format indicator (SFI) indicating the one or more semi-static flexible symbols as downlink or flexible symbols or the UE fails to receive the SFI.

11. The method of claim 5, wherein the configuration configures the UE to:
    cancel reporting the acknowledgement feedback if either the overlap is due to a slot format indicator (SFI) indicating the one or more semi-static flexible symbols as downlink or flexible symbols or the UE fails to receive the SFI.

12. A method for wireless communications by a network entity, comprising:
    determining that a slot scheduled for a user equipment (UE) to report acknowledgment feedback for a semi-persistently scheduled (SPS) physical downlink shared channel (PDSCH) overlaps with at least one downlink or flexible symbol; and deciding to monitor for the UE to delay reporting the acknowledgment feedback if a first condition related to a cause of the overlap is met or to refrain from monitoring for the acknowledgment feedback if a second condition related to a cause of the overlap is met.

13. The method of claim 12, wherein
the first condition is considered met if at least one of:
the overlap is due to signaling indicating semi-static downlink symbols via time division duplexing (TDD) configuration, synchronization signal block (SSB) configuration, or control resource set (CORESET) configuration signaling; or
the overlap is due to a downlink control information (DCI) switching one or more semi-static flexible symbols to downlink symbols.

14. The method of claim 13, wherein the decision is to monitor for the UE to delay reporting the acknowledgment feedback to a next available slot or subslot if the first condition is met.

15. The method of claim 14, wherein the second condition is considered met if at least one of:
the overlap is due to a downlink control information (DCI) switching one or more semi-static flexible symbols to downlink symbols;
the overlap is due to a slot format indicator (SFI) indicating the one or more semi-static flexible symbols as downlink or flexible symbols; or
the UE fails to receive the SFI.

16. The method of claim 12, further comprising signaling, to the UE, a configuration configuring the UE whether to delay or cancel reporting the acknowledgment feedback if the first condition or the second condition is met.

17. The method of claim 16, wherein the configuration configures the UE to delay reporting the acknowledgment feedback when the first condition is met.

18. The method of claim 16, wherein the configuration configures the UE to cancel reporting the acknowledgment feedback when the second condition is met.

19. The method of claim 16, wherein the configuration configures the UE to cancel reporting the acknowledgment feedback when the UE fails to receive the SFI.

20. The method of claim 16, wherein the configuration configures the UE to cancel or to delay reporting the acknowledgment feedback when the overlap is due to a slot format indicator (SFI) indicating the one or more semi-static flexible symbols as downlink or flexible symbols.

21. The method of claim 16, wherein the configuration configures the UE to:
delay reporting the acknowledgement feedback when the overlap is due to a downlink control information (DCI) switching one or more semi-static flexible symbols to downlink symbols; or
cancel reporting the acknowledgement feedback when the overlap is due to a slot format indicator (SFI) indicating the one or more semi-static flexible symbols as downlink or flexible symbols or the UE fails to receive the SFI.

22. The method of claim 16, wherein the configuration configures the UE to:
cancel reporting the acknowledgement feedback if either the overlap is due to a slot format indicator (SFI) indicating the one or more semi-static flexible symbols as downlink or flexible symbols or the UE fails to receive the SFI.

23. An apparatus for wireless communications by a user equipment (UE), comprising:
at least one processor and a memory configured to
determine that a slot scheduled for reporting acknowledgment feedback for a semi-persistently scheduled (SPS) physical downlink shared channel (PDSCH) overlaps with at least one downlink or flexible symbol;
decide to delay reporting the acknowledgment feedback to a network entity if a first condition related to a cause of the overlap is met or to cancel reporting the acknowledgment feedback to the network entity if a second condition related to a cause of the overlap is met; and
cancel or delay reporting the acknowledgment feedback to the network entity, in accordance with the decision.

24. An apparatus for wireless communications by a network entity, comprising:
at least one processor and a memory configured to
determine that a slot scheduled for a user equipment (UE) to report acknowledgment feedback for a semi-persistently scheduled (SPS) physical downlink shared channel (PDSCH) potentially overlaps with at least one downlink or flexible symbol; and
decide to monitor for the UE to delay reporting the acknowledgment feedback if a first condition related to a cause of the overlap is met or to refrain from monitoring for the acknowledgment feedback if a second condition related to a cause of the overlap is met.

* * * * *